(12) United States Patent
Kim et al.

(10) Patent No.: US 11,109,030 B1
(45) Date of Patent: Aug. 31, 2021

(54) METHODS AND SYSTEMS FOR IMAGE DATA COMPRESSION

(71) Applicant: Facebook Technologies, LLC, Menlo Park, CA (US)

(72) Inventors: Seokhoon Kim, Redmond, WA (US); Cheng Chang, Redmond, WA (US); Zhi Zhou, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 50 days.

(21) Appl. No.: 16/742,773

(22) Filed: Jan. 14, 2020

(51) Int. Cl.
*H04N 19/124* (2014.01)
*H04N 19/182* (2014.01)
*H04N 19/186* (2014.01)
*H04N 19/166* (2014.01)
*H04N 19/184* (2014.01)

(52) U.S. Cl.
CPC ......... *H04N 19/124* (2014.11); *H04N 19/166* (2014.11); *H04N 19/182* (2014.11); *H04N 19/184* (2014.11); *H04N 19/186* (2014.11)

(58) Field of Classification Search
None
See application file for complete search history.

(56) References Cited

U.S. PATENT DOCUMENTS

2009/0135921 A1\* 5/2009 Lei ...................... H04N 19/197 375/245

\* cited by examiner

*Primary Examiner* — Lindsay J Uhl
(74) *Attorney, Agent, or Firm* — Baker Botts L.L.P.

(57) ABSTRACT

In one embodiment, a computing system may access a first set of pixel values of an image having a bit depth. The first set of pixel values includes a first subset and a second subset. Each pixel value in the first subset is less than each pixel value in the second subset. The computing system may further determine an overflow range based on a pixel value overflow associated with the bit depth. The overflow range covers a second set of pixel values, which includes (1) the second subset and (2) an overflow representation of the first subset. In response to determining that the overflow range is less than a range covering the first set of pixel values, the computer system may then generate quantization levels corresponding to the overflow range and associate each pixel value of the second set of pixel values with one of the quantization levels.

20 Claims, 9 Drawing Sheets

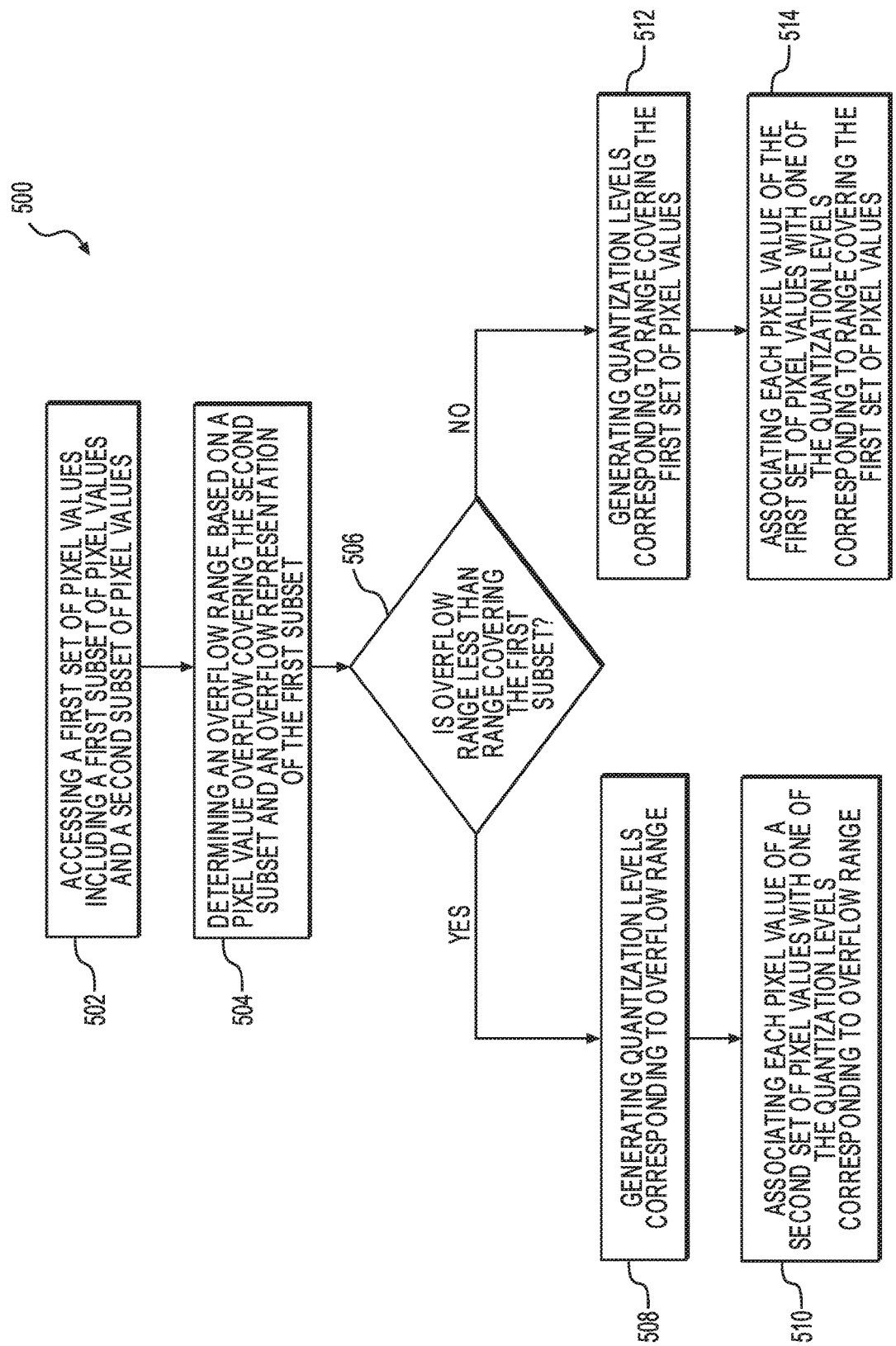

METHODS AND SYSTEMS FOR IMAGE DATA COMPRESSION

TECHNICAL FIELD

This disclosure generally relates to data compression, and, more specifically, to image data compression.

BACKGROUND

As digital media consumption increases, so does the costs relating to memory or storage space and data transmission bandwidth. Thus, data compression is typically deployed as a conventional method for reducing data redundancy, and, by extension, reducing the consumption of memory or storage space and data transmission bandwidth. One particular type of data compression includes image data compression, in which image data is compressed by encoding an original image utilizing fewer bits than those utilized in the generation of the original image. In image data compression, the objective is to preserve most of the color information and other pertinent image information associated with the original image while mitigating the data redundancies. Desirably, any differences between the original image and the compressed image may be imperceptible to a user, for example, viewing the compressed image on a display. In this manner, the compressed image can then be stored and/or transmitted without an undesirable increase in costs such as memory or storage space and data transmission bandwidth. However, for certain types of images, utilizing conventional image data compression methods may lead to a decrease in the quality and perceptibility of the compressed image.

SUMMARY OF PARTICULAR EMBODIMENTS

The present embodiments include providing an encoder device useful in selectively applying a pixel value overflow encoding and compression technique, which may improve compression rate and further increase the quality and perceptibility of compressed images by reducing pixel error accumulation. In certain embodiments, the encoder device may receive an N-bit image and access a set of pixel values of the N-bit image to determine a bit depth of the image. For example, in one embodiment, the image may include an 8-bit color image to be compressed and stored and/or transmitted.

In some embodiments, the encoder device may then determine a pixel value overflow with respect to the determined bit depth of the original image and determine an overflow range of the pixel values of the image based on the pixel value overflow. For example, for an N-bit color image (where N represents the resolution of the image in bits), the encoder device may determine an original range (e.g., $\Delta_{Original}$) of the pixel values (e.g., ranging from 0 to $2^N-1$) included in the original image. The encoder device may then determine an overflow range (e.g., $\Delta_{Overflow}$) based on, for example, a difference between the lowest pixel value of an upper range of pixel values of the original image and the highest pixel value of an overflow representation of the original image. The encoder device may then compare the original range (e.g., $\Delta_{Original}$) and the overflow range (e.g., $\Delta_{Overflow}$). In certain embodiments, if the overflow range (e.g., $\Delta_{Overflow}$) is determined by the encoder device to be less than the original range (e.g., $\Delta_{Original}$), the encoder device may encode the original image by applying the present pixel value overflow encoding and compression techniques, in accordance with the presently disclosed embodiments.

Specifically, when the overflow range (e.g., $\Delta_{Overflow}$) is determined by the encoder device to be less than the original range (e.g., $\Delta_{Original}$), the encoder device may add the pixel value overflow (e.g., pixel value of $2^N$ or greater) to each pixel value below a median pixel value of the original range (e.g., $\Delta_{Original}$) of pixel values in accordance with the present techniques. The encoder device may then proceed in generating one or more quantization levels corresponding to the overflow range (e.g., $\Delta_{Overflow}$) and the upper range of pixel values (e.g., original pixel values above the median pixel value) of the original image. For example, the encoder device may associate each pixel value of the overflow range (e.g., $\Delta_{Overflow}$) and the upper range of pixel values (e.g., original pixel values above the median pixel value) of the original image with a quantization level of the generated quantization levels corresponding to the overflow range (e.g., $\Delta_{Overflow}$), and may then compress the original image based thereon.

On the other hand, if the overflow range (e.g., $\Delta_{Overflow}$) is determined by the encoder device not to be less than the original range (e.g., $\Delta_{Original}$), the encoder device may forego applying the present pixel value overflow encoding and compression techniques. Instead, the encoder device may encode the original image based on the original range (e.g., $\Delta_{Original}$) of pixel values. Particularly, when the overflow range (e.g., $\Delta_{Overflow}$) is determined by the encoder device not to be less than the original range (e.g., $\Delta_{Original}$), the encoder device may determine that any potential pixel error accumulation is below a maximum error accumulation threshold (e.g., predetermined acceptable threshold). Thus, the encoder device may proceed in generating one or more quantization levels corresponding to the original range (e.g., $\Delta_{Original}$) of pixel values of the original image. For example, the encoder device may associate each pixel value with a quantization level (e.g., each selected based on the pixel accumulation error) of quantization levels corresponding to the original range (e.g., $\Delta_{Original}$), and may then compress the original image based thereon.

Therefore, the presently disclosed embodiments may allow for the selective application of the present pixel value overflow encoding and compression techniques, such that the quantization levels may be generated and determined based on the comparison between the overflow range (e.g., $\Delta_{Overflow}$) and the original range (e.g., $\Delta_{Original}$), as opposed to, for example, based solely upon the pixel error accumulation. In accordance with the present techniques, the number of n total bits of each quantized pixel value may be reduced. Thus, the presently disclosed embodiments may improve compression rate. Further, even when the number of n total bits of each quantized pixel value is maintained, the pixel error accumulation is nevertheless reduced. Accordingly, the presently disclosed embodiments may increase the quality and perceptibility of compressed images by reducing pixel error accumulation.

In certain embodiments, subsequent to the addition of the pixel value overflow (e.g., pixel value of $2^N$ or greater) to each pixel value below the median pixel value of the original range of pixel values (e.g., corresponding to the case in which the overflow range ($\Delta_{Overflow}$) is determined by the encoder device to be less than the original range ($\Delta_{Original}$) as discussed above), the encoder device may detect that a color associated with one or more pixel values of the overflow range (e.g., $\Delta_{Overflow}$) has been inverted with respect to a corresponding pixel value of the original range (e.g., $\Delta_{Original}$) and/or with respect to the generated range of quantization levels. In some embodiments, in response to determining that the color has been inverted, the encoder device may compensate for the color inversion by either 1) setting the color-inverted pixel value to a value of $2^N-1$ (e.g., saturation pixel value) and then to a quantization level of less than $2^N-1$, or by 2) setting the inverted pixel value to a lowest quantization level of the generated quantization levels corresponding to the overflow range (e.g., $\Delta_{Overflow}$) and the upper range of pixel values (e.g., original pixel values above the median pixel value) of the original range (e.g., $\Delta_{Original}$).

For example, in certain embodiments, the encoder device may compare the $k^{th}$ bit (where k represents the most significant bit [MSB]) of a given pixel value of the overflow range (e.g., $\Delta_{Overflow}$) to the $k^{th}$ bit (e.g., MSB) of a corresponding pixel value of the original range (e.g., $\Delta_{Original}$) and/or the generated range of quantization levels. The encoder device may then determine whether the $k^{th}$ bit (e.g., MSB) has changed, for example, from an i binary value in the original range (e.g., $\Delta_{Original}$) of pixel values to a j binary value in the overflow range (e.g., $\Delta_{Overflow}$) of pixel values and/or in the generated range of quantization levels. Specifically, if the encoder device determines that the $k^{th}$ bit (e.g., MSB) has changed from a i binary value to a j binary value (or vice-versa), the encoder device may determine that color inversion of the pixel value occurred during the quantization. Thus, as previous noted above, the encoder device may then proceed by either 1) setting the color-inverted pixel value to a value of $2^N-1$ (e.g., saturation pixel value) and then to a quantization level of less than $2^N-1$, or by 2) setting the color-inverted pixel value to a lowest quantization level of the generated quantization levels corresponding to the overflow range (e.g., $\Delta_{Overflow}$) and the upper range of pixel values (e.g., original pixel values above the median pixel value) of the original range (e.g., $\Delta_{Original}$). In one embodiment, the encoder device may select between 1) setting the color-inverted pixel value to a value of $2^N-1$ (e.g., saturation pixel value) and 2) setting the color-inverted pixel value to a lowest quantization level based on, for example, whether a total number of color-inverted pixel values detected exceed a particular threshold.

Conversely, if the encoder device determines that the $k^{th}$ bit (e.g., MSB) has not changed from an i binary value to a j binary value (or vice-versa), the encoder device may determine that color inversion did not occur during the quantization. The encoder device may thus forgo any further adjustment to the given pixel value. In this way, even when the present pixel value overflow encoding and compression techniques are deployed as part of the image compression, the encoder device may compensate for any possible color inversion associated with the pixel value overflow without unnecessary degradation to the quality and perceptibility of the compressed image.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example method for selectively applying a pixel value overflow encoding and compression technique, in accordance with the present embodiments.

DESCRIPTION OF EXAMPLE EMBODIMENTS

Figure 1A:
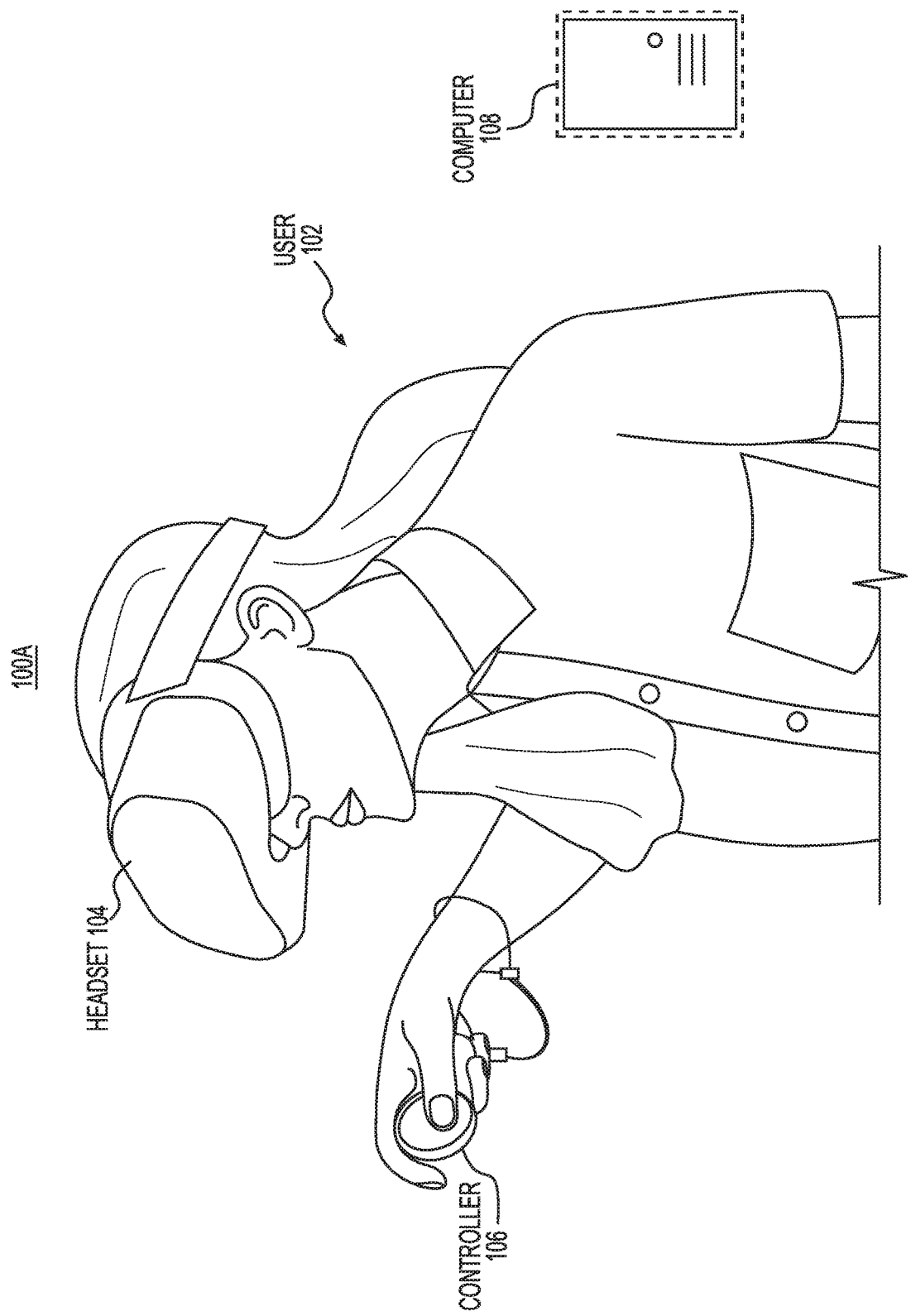
FIG. 1A illustrates an example artificial reality system, in accordance with the present embodiments.

In compressing image data, the quality of the image compression typically depends on, for example, the range of color that is to be displayed. For example, for an 8-bit color image, the gray level color range may include pixel values "0"-"255", in which "0" corresponds to the darkest possible color (e.g., black) that may be displayed at any given pixel location and "255" may correspond to the brightest possible color (e.g., white) that may be displayed at any given pixel location. Thus, conventional image compression techniques may include allocating a number of available bits to the range of pixel values that exists in any given pixel quadrant of the original image, and then selecting a quantization level (and corresponding quantized pixel value) based on the pixel error accumulation. However, in some instances, at least in part due to the very large quantization step size in the compression of such images, all of the lower range of 8-bit color pixel values may be clustered into the lowest quantization level (e.g., "20"), which may correspond, for example, to the lowest quantized pixel value of "0", for example. Similarly, all of the upper range of 8-bit color pixel values may be clustered into the highest quantization level (e.g., "255"), which may correspond, for example, to the highest quantized pixel value of "3". Indeed, because the pixel value range and quantization step size for such images may indeed be very large, and further because the pixel accumulation error is an increasing function of the quantization step size, attempting to compress such images may lead to undesirably high pixel error accumulation. This may in turn lead to a decrease in the quality (e.g., washed-out pixels) and perceptibility of the compressed image.

Accordingly, the present embodiments include selectively applying a pixel value overflow encoding and compression technique, which may improve compression rate further increase the quality and perceptibility of compressed images by reducing pixel error accumulation. Specifically, in applying the present pixel value overflow encoding and compression technique, the lower range of pixel values of the original image may be shifted into a pixel value overflow range. If the pixel value overflow range of pixel values is determined to be less than the original range of pixel values, the present techniques of selectively applying a pixel value overflow encoding and compression technique. For example, each pixel value below a median pixel value in the original range (e.g., corresponding to the darker color pixels of the original image) may be incremented by the pixel value overflow (e.g., "256" or other 9-bit integer value). Thus, one or more quantization levels corresponding to the overflow range of pixel values may be generated and each pixel value of the overflow range may be associated with a quantization level of the generated quantization levels. The original image may be then compressed based thereon. As such, the presently disclosed embodiments may improve compression rate and further increase the quality and perceptibility of compressed images by reducing pixel error accumulation.

In certain embodiments, subsequent to the application of the present pixel value overflow encoding and compression technique, if it is determined that color inversion has occurred with respect to any pixel values of the overflow range of pixel values, the color-inverted pixel values may be compensated for by 1) setting the color-inverted pixel value (e.g., "wrapping around" the pixel value overflow) to a value of "255" (e.g., saturation pixel value for an 8-bit color image) and then to a quantization level of less than "255", or by 2) setting the color-inverted pixel value to a lowest quantization level of the generated quantization levels corresponding to the overflow range. Indeed, while the present techniques may be henceforth discussed primarily with respect to an encoding and compression of an 8-bit color image, it should be appreciated that the present techniques may be applied to any N-bit color image (e.g., a 2-bit color image, a 4-bit color image, a 6-bit color image, a 10-bit color image, a 12-bit color image, a 16-bit color image, a 24-bit color image, and so forth).

FIG. 1A illustrates an example artificial reality system 100A. In particular embodiments, the artificial reality system 100A may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
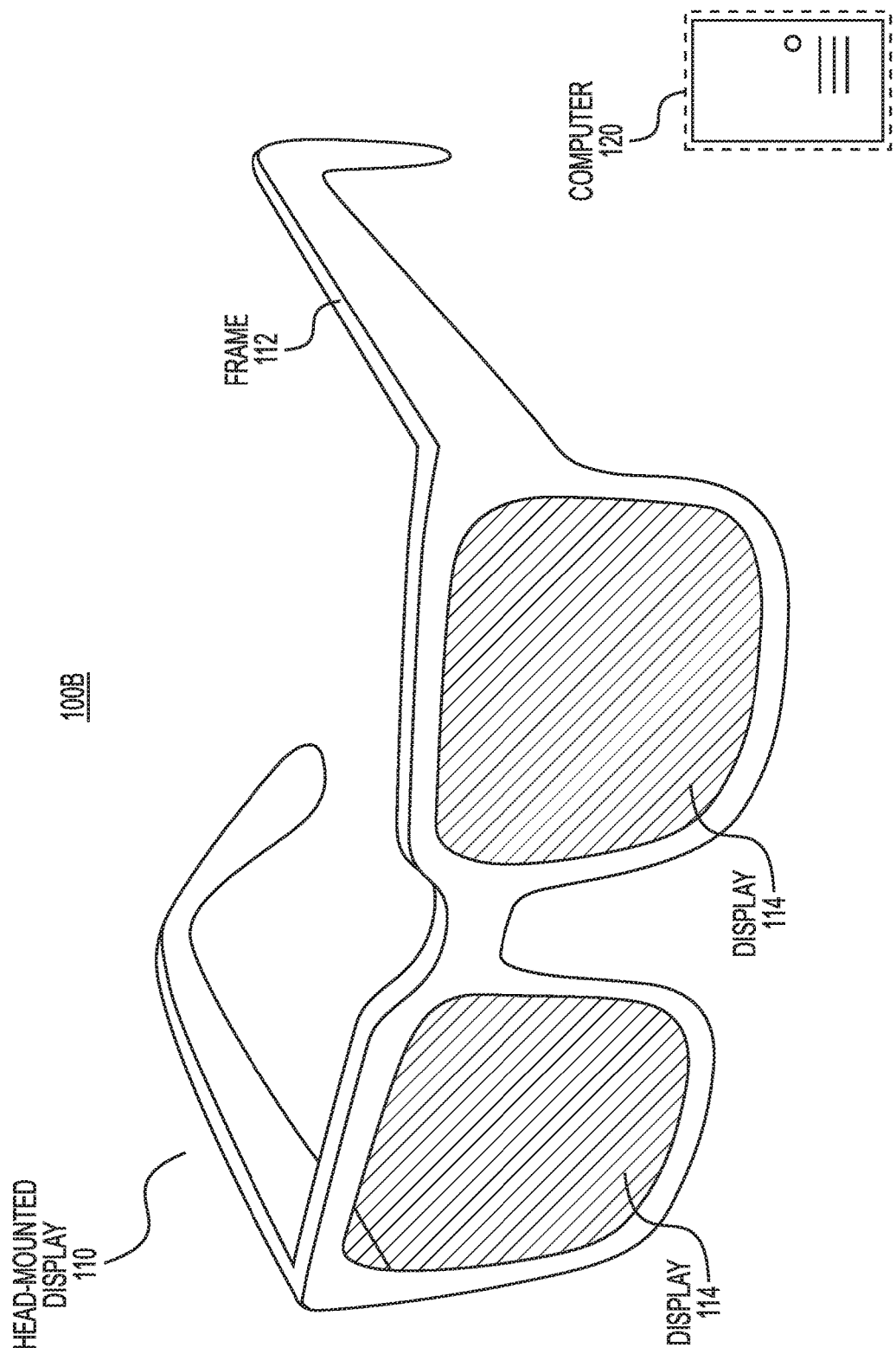
FIG. 1B illustrates an example augmented reality system, in accordance with the present embodiments.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2:
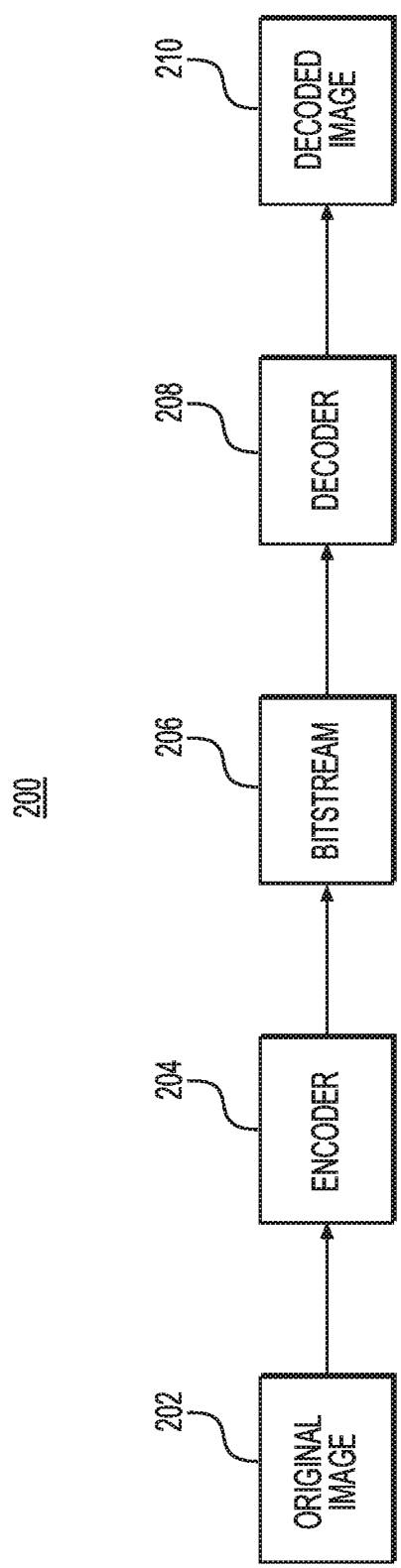
FIG. 2 illustrates an example encoder-decoder (codec) system, in accordance with the present embodiments.

FIG. 2 illustrates an encoder-decoder (codec) system 200 that may be useful in selectively applying a pixel value overflow encoding and compression technique in accordance with the present embodiments. In some embodiments, the codec system 200 may be implemented as part of a subsystem on one or more general purpose processors, or may include a standalone graphic processing units (GPU), an application-specific integrated circuit (ASIC), a system-on-chip (SoC), a microcontroller, a field-programmable gate array (FPGA), or any other processing device(s) that may be suitable for processing image data. As depicted in FIG. 2, in some embodiments, the data flow of the codec system 200 may include receiving an original image 202 to be encoded via an encoder device 204, stored into a bitstream 206, and decoded via a decoder device 208 to generate a compressed and decoded image 210 to be stored and/or transmitted.

In one embodiment, the original image 202 may include one or more 8-bit color images (e.g., still images, video images) including, for example. In other embodiments, the original image 202 may include a 2-bit color image, a 4-bit color image, a 6-bit color image, a 10-bit color image, a 12-bit color image, a 16-bit color image, a 24-bit color image, or any suitable N-bit color image that may be received and processed by the codec system 200. In certain embodiments, the encoder device 204 may include any device that may be utilized, for example, to receive the original image 202 and convert the original image 202 into a bitstream 206 (e.g., binary pixel data). Similarly, the decoder device 208 may include any device that may be utilized, for example, to receive the encoded bitstream 206 of binary pixel data and decode the bitstream 206 (e.g., binary pixel data) to generate the compressed and decoded image 210. Indeed, as will be further appreciated with respect to FIGS. 3A-3B, 4A-4C, and FIG. 5, the codec system 200, and particularly the encoder device 204, may be utilized in selectively applying a pixel value overflow encoding and compression technique, which may improve compression rate and further increase the quality and perceptibility of compressed images by reducing pixel error accumulation, in accordance with the present embodiments.

Figure 3A:
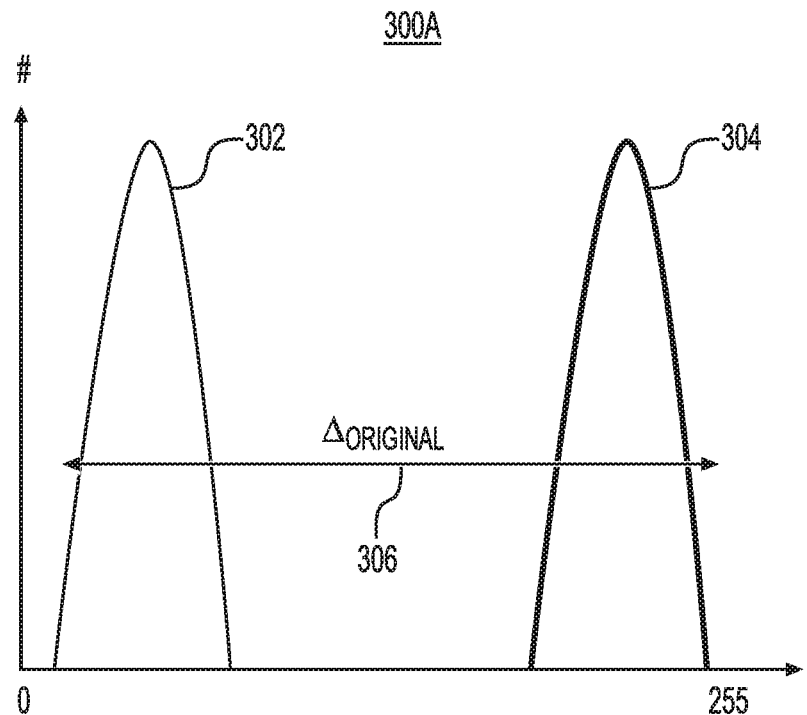
FIG. 3A illustrates a pixel value mapping function diagram, in accordance with the present embodiments.
Figure 3B:
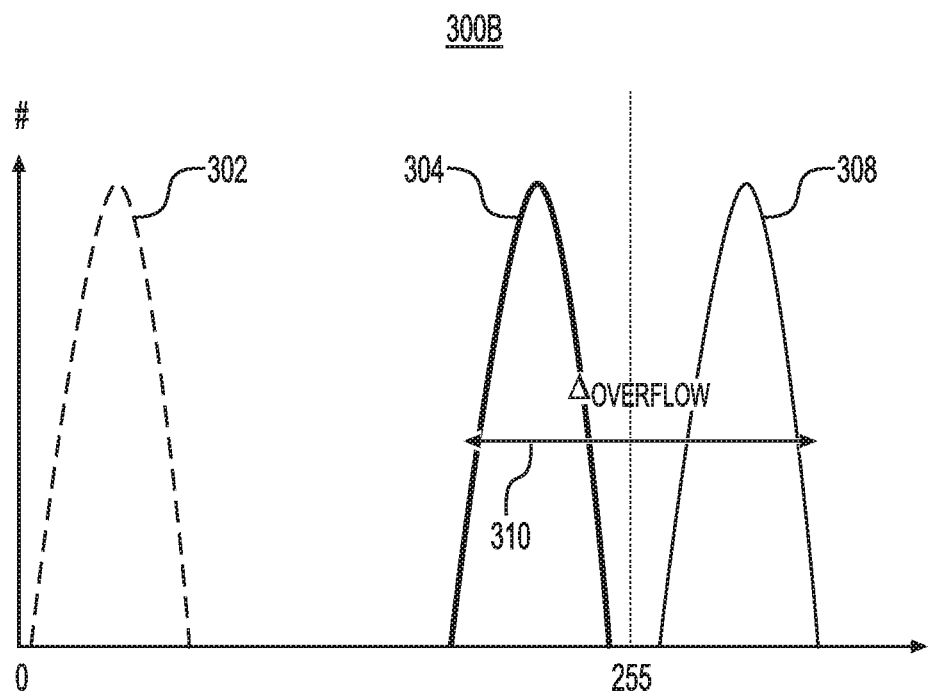
FIG. 3B illustrates a pixel value mapping function diagram, in accordance with the present embodiments.

Turning now to FIGS. 3A and 3B, a pixel value mapping function diagram 300A for an original range (e.g., $\Delta_{Original}$) of pixel values and a pixel value mapping function diagram 300B for an overflow range (e.g., $\Delta_{Overflow}$) of pixel values are illustrated, respectively. As it may be worth noting, while the present pixel value mapping functions 300A and 300B may illustrate pixel values for an 8-bit color image (e.g., including pixel value range of "0"-"255"), it should be appreciated that the present techniques may be applied to any N-bit color image (e.g., a 2-bit color image, a 4-bit color image, a 6-bit color image, a 10-bit color image, a 12-bit color image, a 16-bit color image, a 24-bit color image, and so forth). As depicted in FIG. 3A, the pixel value mapping function diagram 300A may include a first mapping function 302 illustrating, for example, a lower range of 8-bit color pixel values (e.g., approximately ranging from "0" to "64"). Similarly, the pixel value mapping function diagram 300B may include a second mapping function 304 illustrating, for example, an upper range of 8-bit color pixel values (e.g., approximately ranging from "192" to "255"). In one embodiment, the upper range of 8-bit color pixel values (e.g., approximately ranging from "192" to "255") may correspond to one or more edge features of, for example, the original image 202 as discussed above with respect to FIG. 2.

In certain embodiments, as further illustrated by the pixel value mapping function diagram 300A in FIG. 3A, the encoder device 204 may determine an original range 306 (e.g., $\Delta_{Original}$) of pixel values. For example, the original range 306 (e.g., $\Delta_{Original}$) of pixel values may correspond to a range bounded by the lowest pixel value of the first mapping function 302 and the highest pixel value of the second mapping function 304. As may be further ascertainable from the original range 306 (e.g., $\Delta_{Original}$) in the pixel value mapping function diagram 300A, the original range 306 (e.g., $\Delta_{Original}$) may be very large due to all of the pixel values being clustered into either the lower range of 8-bit color pixel values (e.g., approximately ranging from "0" to "64") illustrated by the first mapping function 302 or the upper range of 8-bit color pixel values (e.g., approximately ranging from "192" to "255") illustrated by the second mapping function 304. Indeed, as will be further appreciated with respect to the examples provided in FIGS. 4A-4C, attempting to compress such images utilizing conventional image compression methods may lead to undesirably high pixel error accumulation, and thereby a decrease in the quality and perceptibility of the compressed images.

Accordingly, in certain embodiments, it may be useful to provide an overflow range (e.g., $\Delta_{Overflow}$) of pixel values as illustrated by the pixel value mapping function diagram 300B. As depicted in FIG. 3B, the first mapping function 302 representing the lower range of 8-bit color pixel values may be shifted to an overflow range 210 (e.g., $\Delta_{Overflow}$) as illustrated by the overflow mapping function 308. Specifically, in some embodiments, the encoder device 204 may determine a pixel value overflow (e.g., pixel value of "256" for an 8-bit color image) with respect to the bit depth (e.g., 8-bit color depth) of the original image 202 and determine an overflow range 210 (e.g., $\Delta_{Overflow}$) of the pixel values based on the pixel value overflow. For example, referring again to FIG. 3B, for an 8-bit color image, the encoder device 204 may determine an overflow range 210 (e.g., $\Delta_{Overflow}$) based on, for example, a difference between the lowest pixel value of the second mapping function 304 (e.g., representing the lower range of 8-bit color pixel values of the original image 202) and the highest pixel value of an overflow representation (e.g., represented by the overflow mapping function 308) of the original image 202. The encoder device 204 may then compare the overflow range 310 (e.g., $\Delta_{Overflow}$) to the original range 306 (e.g., $\Delta_{Original}$).

In certain embodiments, if the overflow range 310 (e.g., $\Delta_{Overflow}$) is determined by the encoder device 204 to be less than the original range 306 (e.g., $\Delta_{Original}$), the encoder device 204 may encode the original image 202 by applying the present pixel value overflow encoding and compression techniques, in accordance with the presently disclosed embodiments. Specifically, as will be discussed in further detail with respect to FIG. 4B, for example, when the overflow range 310 (e.g., $\Delta_{Overflow}$) is determined by the encoder device 204 to be less than the original range 306 (e.g., $\Delta_{Original}$), the encoder device 204 may add the pixel value overflow (e.g., pixel value of "256" for a 8-bit color image) to each pixel value below a median pixel value (e.g., corresponding to the lower range of 8-bit color pixel values and represented by the first mapping function 302) of the original range 306 (e.g., $\Delta_{Original}$).

The encoder device 204 may then proceed in generating one or more quantization levels corresponding to the overflow range 310 (e.g., $\Delta_{Overflow}$) and the pixel values above the median pixel value (e.g., corresponding to the upper range of 8-bit color pixel values and represented by the second mapping function 304) of the original image 202. For example, the encoder device 204 may associate each pixel value of the overflow range 310 (e.g., $\Delta_{Overflow}$) and the pixel values above the median pixel value (e.g., corresponding to the upper range of 8-bit color pixel values and represented by the second mapping function 304) with a quantization level of the generated quantization levels corresponding to the overflow range 310 (e.g., $\Delta_{Overflow}$) and the pixel values above the median pixel value (e.g., corresponding to the upper range of 8-bit color pixel values and represented by the second mapping function 304), and may then compress the original image 202 based thereon, for example.

On the other hand, if the overflow range 310 (e.g., $\Delta_{Overflow}$) is determined by the encoder device 204 not to be less than the original range 306 (e.g., $\Delta_{Original}$), the encoder device 204 may forego applying the present pixel value overflow encoding and compression techniques. Rather, the encoder device 204 may encode the original image 202 based on the original range 306 (e.g., $\Delta_{Original}$) of pixel values. Specifically, when the overflow range 310 (e.g., $\Delta_{Overflow}$) is determined by the encoder device 204 not to be less than the original range 306 (e.g., $\Delta_{Original}$), the encoder device 204 may determine that any potential pixel error accumulation is below a maximum error accumulation threshold (e.g., predetermined acceptable threshold). Thus, the encoder device 204 may proceed in generating one or more quantization levels corresponding to the original range 306 (e.g., $\Delta_{Original}$) of pixel values.

For example, the encoder device 204 may associate each pixel value with a quantization level (e.g., each selected based on the pixel accumulation error) of quantization levels corresponding to the original range 306 (e.g., $\Delta_{Original}$). Therefore, the presently disclosed embodiments may allow for the selective application of the pixel value overflow encoding and compression techniques, such that the quantization levels may be generated and determined based on the comparison between the overflow range 310 (e.g., $\Delta_{Overflow}$) and the original range 306 (e.g., $\Delta_{Original}$), as opposed to, for example, based solely upon the pixel error accumulation. In this way, as will be further appreciated with respect to the illustrative examples provided by FIGS. 4A-4C, the number of n total bits of each quantized pixel value may be reduced. Thus, the presently disclosed embodiments may improve compression rate. Further, even when the number of n total bits of each quantized pixel value is maintained, the pixel error accumulation is nevertheless reduced. Accordingly, the presently disclosed embodiments may improve compression rate and further increase the quality and perceptibility of compressed images by reducing pixel error accumulation.

Figure 4A:
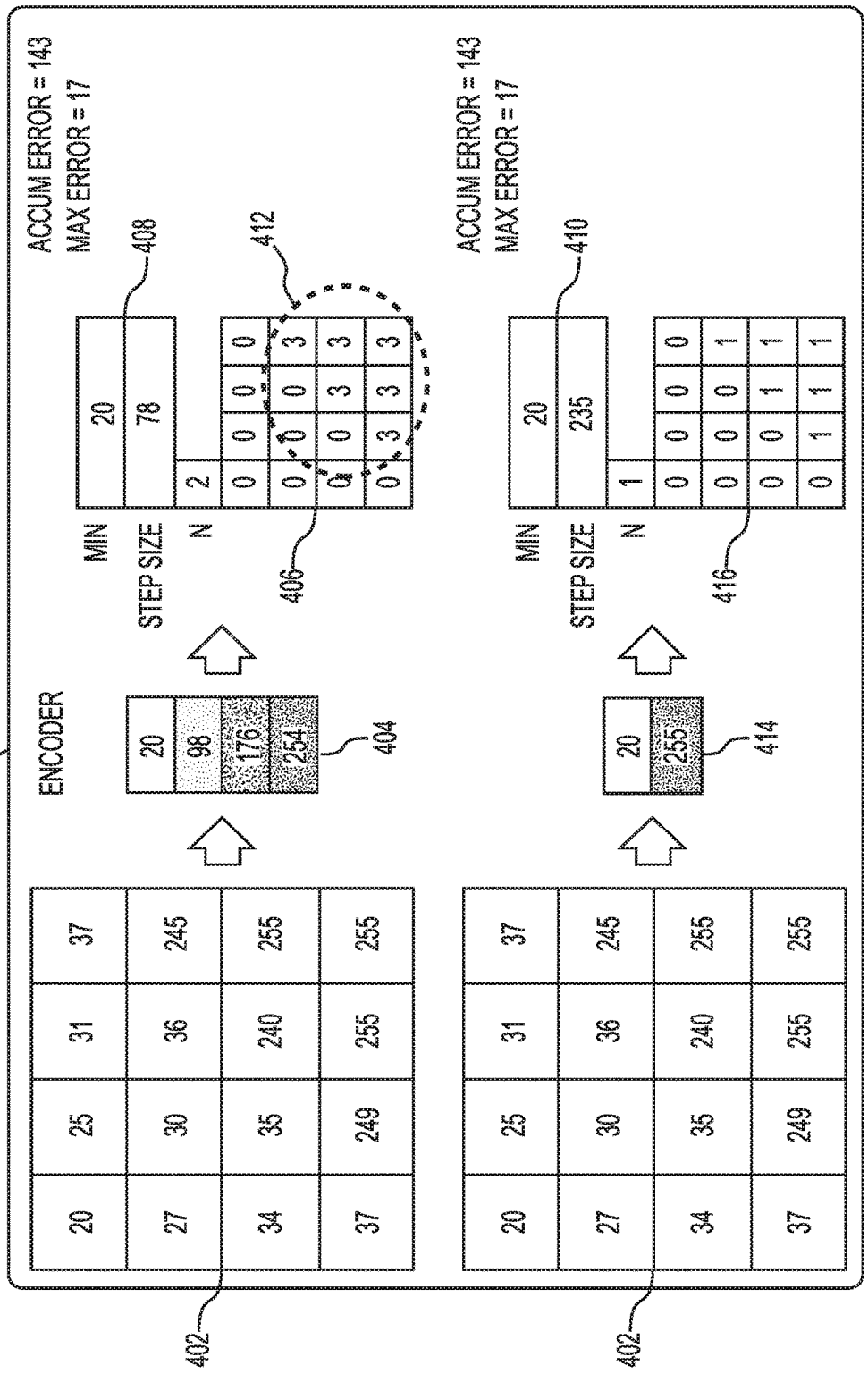
FIG. 4A illustrates encoder device logic useful in providing encoding and compression of images, in accordance with the present embodiments.
Figure 4B:
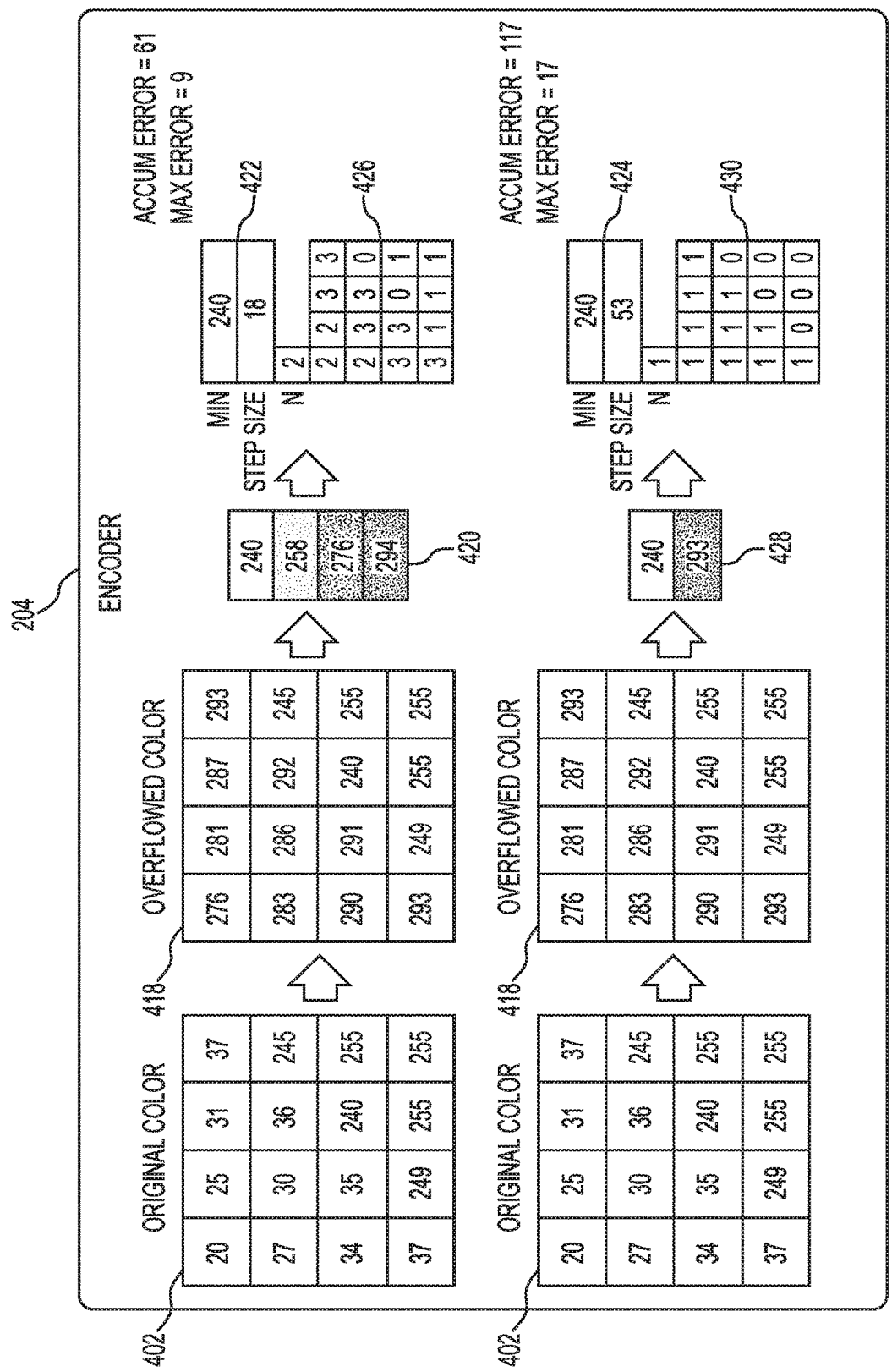
FIG. 4B illustrates encoder device logic that may be useful in selectively applying a pixel value overflow encoding and compression technique for compression of images, in accordance with the present embodiments.
Figure 4C:
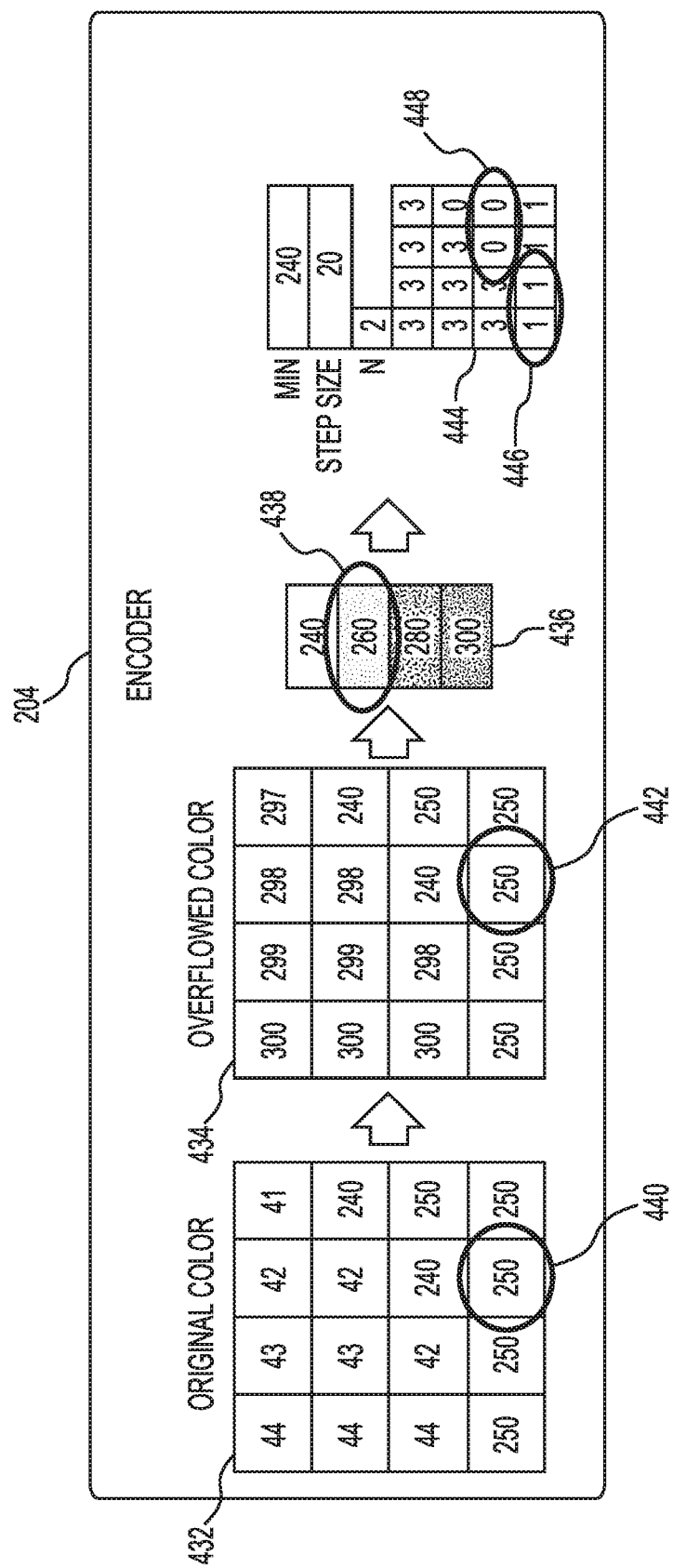
FIG. 4C illustrates encoder device logic that may be useful in compensating for pixel value color inversion, in accordance with the present embodiments.

FIGS. 4A, 4B, and 4C provide illustrative examples of the forgoing embodiments. For example, as will be appreciated with respect to FIGS. 4A, 4B, and 4C, the encoder 204 may include logic (e.g., which may include one or more software systems, one or more hardware systems, or some combination thereof) that performs the present techniques. For example, referring first to FIG. 4A, the encoder device 204 may receive and analyze an original pixel grid 402. In some embodiments, the original pixel grid 402 may include, for example, a 4×4 quadrant of pixel values (e.g., including 16 individual pixel values) of a larger grid of pixels (e.g., including 64 individual pixel values). In other embodiments, the original pixel grid 402 may itself include, for example, groups of 4-pixel grids arranged into the original pixel grid 402. As depicted in FIG. 4A, the original pixel grid 402 may include a lower range of 8-bit color pixel values (e.g., "20", "25", "27", "30", "31", "32", "34", "35", "36", "37", "37") and an upper range of 8-bit color pixel values (e.g., "240", "245", "249", "255", "255", "255").

As further illustrated, the encoder device 204 may generate a set of quantization levels 404 (e.g., "20", "98", "176", "254") based on the original pixel grid 402. Specifically, for n=2 (where n represents the total number of bits each quantized pixel value may include), as depicted by the value cells 408, 410, for example, the encoder device 204 may determine the lowest quantization level based on the minimum pixel value (e.g., "20") of the original pixel grid 402 and a quantization step size "78" (e.g., corresponding to the step size between each of the quantization levels 404). In some embodiments, the encoder device 204 may determine the quantization step size based on, for example, a quotient of the range between the maximum pixel value (e.g., "255") and the minimum pixel value (e.g., "20") and $2^n-1$ (where n represents the total number of bits each quantized pixel value may include).

In certain embodiments, the encoder device 204 may then associate each pixel value of the original pixel grid 402 with one of the quantization levels 404 (e.g., "20", "98", "176", "254") based on a comparison of each original pixel value quantization error to a pixel value quantization error threshold (e.g., pixel value max error of 17). The encoder device 204 may then generate the quantized pixel values 406 based on the quantization levels 404 (e.g., "20", "98", "176", "254"), which may each correspond respectively to one of the quantized pixel values: "0", "1", "2", "3". However, as illustrated by the quantized pixel values 406, all of the lower range of 8-bit color pixel values (e.g., "20", "25", "27", "30", "31", "32", "34", "35", "36", "37", "37") may be clustered into the lowest quantization level (e.g., "20"), which corresponds to the lowest quantized pixel value of "0". Likewise, all of the upper range of 8-bit color pixel values (e.g., "240", "245", "249", "255", "255", "255") may be clustered into the highest quantization level (e.g., "254"), which corresponds to the highest quantized pixel value of "3" (as highlighted by dashed circle 412). As such, the quantization levels "98", "176" and corresponding quantized pixel values "1", "2" may not be utilized. This may lead to a decrease in the quality (e.g., washed-out pixels) and perceptibility of the compressed image.

A similar occurrence may be observed with respect to the generated quantization levels 414 (e.g., "204", "255") for n=1. For example, as illustrated by the quantized pixel values 416, all of the lower range of 8-bit color pixel values (e.g., "20", "25", "27", "30", "31", "32", "34", "35", "36", "37", "37") may be clustered into the lowest quantization level (e.g., "20"), which corresponds to the lowest quantized pixel value of "0". Similarly, all of the upper range of 8-bit color pixel values (e.g., "240", "245", "249", "255", "255", "255") may be clustered into the highest quantization level (e.g., "255"), which corresponds to the highest quantized pixel value of "1". Indeed, because the respective quantization step sizes are very large (e.g., for n=2: quantization step size="78"; for n=1: quantization step size="235") and further because the pixel accumulation error is an increasing function of the quantization step size, attempting to compress such images may lead to undesirably high pixel error accumulation (e.g., for n=2: pixel value accumulation error="85"; for n=1: pixel value accumulation error="143"). As previously noted, in the absence of the presently disclosed techniques, attempting to compress such images may thus lead to a decrease in the quality and perceptibility of compressed image.

Accordingly, FIG. 4B illustrates an encoder device 204 logic that may be useful in selectively applying a pixel value overflow encoding and compression technique, which may improve compression rate and further increase the quality and perceptibility of compressed images by reducing pixel error accumulation, in accordance with the presently disclosed embodiments. For example, as depicted by FIG. 4B, the encoder device 204 may generate an overflow pixel grid 418 based on, for example, a pixel value overflow. Specifically, as previously discussed above with respect to FIG. 3B, when the overflow range 310 (e.g., $\Delta_{Overflow}$) is determined by the encoder device 204 to be less than the original range 306 (e.g., $\Delta_{Original}$), the encoder device 204 may add a pixel value overflow of "256" (e.g., for an 8-bit color image) to each pixel value below a median pixel value of "37" of the original pixel grid 402.

For example, in one embodiment, the encoder device 204 may add a pixel value of "256" to each of the lower range of 8-bit color pixel values (e.g., "20", "25", "27", "30", "31", "32", "34", "35", "36", "37", "37") of the original pixel grid 402. In other embodiments, the encoder device 204 may add an additional grid of pixel values to the original pixel grid 402, in which the additional pixel grid may include a pixel value of "256" at pixel locations corresponding to the lower range of 8-bit color pixel values (e.g., "20", "25", "27", "30", "31", "32", "34", "35", "36", "37", "37") of the original pixel grid 402 and a pixel value of "0" at pixel locations corresponding the upper range of 8-bit color pixel values (e.g., "240", "245", "249", "255", "255", "255") of the original pixel grid 402. Thus, as further illustrated by FIG. 4B, the overflow pixel grid 418 may include, for example, the upper range of 8-bit color pixel values (e.g., "240", "245", "249", "255", "255", "255") of the original pixel grid 402 along with an overflow range of 9-bit color pixel values (e.g., "276", "281", "287", "287", "293", "283", "286", "292", "245", "290", "291").

In certain embodiments, the encoder device 204 may then proceed in generating a set of overflow quantization levels 420 (e.g., "240", "258", "276", "294") based on the overflow pixel grid 418. Particularly, for n=2 (where n represents the total number of bits each quantized pixel value may include), as depicted by the value cells 422, 424, for example, the encoder device 204 may determine the lowest quantization level based on the minimum pixel value (e.g., "240") of the overflow pixel grid 418 and a quantization step size "18" (e.g., corresponding to the quantization step size between each of the overflow quantization levels 420). The encoder device 204 may generate the quantization step size based on, for example, a quotient of the range between the maximum overflow pixel value (e.g., "293") and the minimum pixel value (e.g., "240") and $2^n-1$ (where n represents the total number of bits each quantized pixel value may include).

In certain embodiments, the encoder device 204 may then associate each pixel value of the overflow pixel grid 418 with one of the overflow quantization levels 420 (e.g., "240", "258", "276", "294") based on, for example, the overflow range 310 (e.g., $\Delta_{Overflow}$) as discussed above with respect to FIG. 3B. For instance, in one embodiment, the overflow range 310 (e.g., $\Delta_{Overflow}$) may correspond to a difference between the highest pixel value (e.g., "293") and the lowest pixel value (e.g., "240") of the overflow pixel grid 418. The encoder device 204 may then generate the quantized pixel values 426 based on the overflow quantization levels 420 (e.g., "240", "258", "276", "294"), which may each correspond respectively to one of the quantized pixel values: "0", "1", "2", "3". As further depicted by the quantized pixel values 426 of FIG. 4B, all of the quantized pixel values: "0", "1", "2", "3" may be utilized in the quantization of the overflow pixel grid 418. A similar illustration may be observed with respect to the generated quantization levels 428 (e.g., "240", "293") and corresponding quantized pixel values 430 (for n=1).

Specifically, by shifting the lower range of 8-bit color pixel values (e.g., "20", "25", "27", "30", "31", "32", "34", "35", "36", "37", "37") of the original pixel grid 402 into the overflow range of 9-bit color pixel values (e.g., "276", "281", "287", "287", "293", "283", "286", "292", "245", "290", "291"), the respective quantization step sizes (e.g., for n=2: quantization step size="18"; for n=1: quantization step size="53") may be reduced, and, by extension, the pixel error accumulation (e.g., for n=2: pixel value accumulation error="61"; for n=1: pixel value accumulation error="117") may be reduced. In this way, the number of n total bits of each quantized pixel value may be reduced. Accordingly, the presently disclosed embodiments may improve compression rate. Further, even when the number of n total bits of each quantized pixel value is maintained, the pixel error accumulation is nevertheless reduced. As such, the presently disclosed embodiments may improve compression rate and further increase the quality and perceptibility of compressed images by reducing pixel error accumulation.

FIG. 4C illustrates an original pixel grid 432 and an overflow pixel grid 434, which may be generated, for example, by the encoder device 204 adding a pixel value overflow of "256" (e.g., for an 8-bit color image) to each pixel value below a median pixel value of "44" of the original pixel grid 432. Thus, as further illustrated by FIG. 4C, the overflow pixel grid 434 may include, for example, the upper range of 8-bit color pixel values (e.g., "240", "240", "250", "250", "250", "250", "250") of the original pixel grid 432 along with an overflow range of 9-bit color pixel values (e.g., "300", "299", "298", "297", "300", "299", "298", 300", "300", "298"). It should be appreciated that while the upper range of pixel values (e.g., "240", "240", "250", "250", "250", "250", "250") may have included 8-bit pixel values (e.g., 8-bit binary values) in the original pixel grid 432, all of the pixel values may be changed to 9-bit pixel values (e.g., 9-bit binary values) in the overflow pixel grid 434. Based on the overflow pixel grid 434, the encoder device 204 may then generate a set overflow quantization levels 442 (e.g., "240", "260", "280", "300").

In certain embodiments, subsequent to generating the overflow pixel grid 434, the encoder device 204 may detect that a color associated with one or more pixel values of the overflow pixel grid 434 and/or the overflow quantization levels 436 (e.g., "240", "260", "280", "300") has been inverted (e.g., undesirably changed from a darker color such as black to an inversely proportional brighter color such as white, or vice-versa) with respect to a corresponding pixel value of the original pixel grid 432 due in part to the pixel value overflow (e.g., "256"). In some embodiments, in response to determining that the color has been inverted, the encoder device 204 may compensate for the color inversion by either 1) setting the color-inverted pixel value to a value of "255" (e.g., saturation pixel value for an 8-bit color image) and then to a quantization level of less than "255", or by 2) setting the color-inverted pixel value (e.g., "wrapping around" the pixel value overflow) to the lowest quantization level (e.g., "240") of the quantization levels 436 (e.g., "240", "260", "280", "300").

As an illustrative example, for a particular original pixel value "250" (as highlighted by circle 440), because the original pixel value "250" is above the median pixel value of "44", the pixel value "250" may remain unsummed in the overflow pixel grid 434 (as highlighted by circle 442). In some embodiments, assuming a minimum pixel value of "240" and a quantization step size of "20", the encoder device 204 may associate the particular pixel value "250" (as highlighted by the circle 442) of the overflow pixel grid 434 with a quantization level of "260" (as highlighted by the circle 438). The encoder device 204 may then compare the $9^{th}$ bit (e.g., MSB) of the particular pixel value "250" (e.g., 011111010) to the $9^{th}$ bit (e.g., MSB) of the quantization level of "260" (e.g., 100000100) to determine whether the $9^{th}$ bit has changed, for example, from a "0" binary value to a "1" binary value (or vice-versa) during the quantization.

Specifically, if the encoder device 204 determines that the $9^{th}$ bit (e.g., MSB) has changed from a "0" binary value to a "1" binary value (or vice-versa), the encoder device 204 may determine that color inversion occurred. Thus, the encoder device 204 may then proceed by either 1) setting the color-inverted pixel value to a value of "255" (e.g., saturation pixel value for an 8-bit color image) and then to a quantization level of less than "255", or by 2) setting the color-inverted pixel value (e.g., "wrapping around" the pixel value overflow) to the lowest quantization level (e.g., "240") of the quantization levels 436 (e.g., "240", "260", "280", "300"). In one embodiment, the encoder device 204 may select between 1) setting the color-inverted pixel value to the 8-bit color saturation value "255" and 2) setting the color-inverted pixel value to the lowest possible quantization level "240" based on, for example, whether a total number of color-inverted pixel values detected exceed a particular threshold. As a further illustrative example of the forgoing techniques, quantized pixel values 444 illustrates overflow pixel value "250" being set to 1) the saturation pixel value "255" (e.g., corresponding to a quantized pixel value of "1") in one embodiment (as highlighted by circle 446) and 2) the lowest possible quantization level "240" (e.g., corresponding to a quantized pixel value of "0") in another embodiment (as highlighted by circle 448).

Conversely, if the encoder device 204 determines that the 9$^{th}$ bit (e.g., MSB) has not changed from a "0" binary value to a "1" binary value (or vice-versa), the encoder device 204 may determine that color inversion did not occur during the quantization. The encoder device 204 may thus forgo any further adjustment to the particular pixel value. For example, for a particular overflow pixel value "240" and again assuming a minimum pixel value of "240" and a quantization step size of "20", the encoder device 204 may associate the particular pixel value "240" (e.g., 011110000) of the overflow pixel grid 434 with a quantization level of "240" (e.g., 011110000) of the quantization levels 436 (e.g., "240", "260", "280", "300") since no change of the 9$^{th}$ bit (e.g., MSB) is detected. In this way, even when the present pixel value overflow encoding and compression techniques are deployed as part of the image compression, the encoder device 204 may compensate for any possible color inversion associated with the pixel value overflow without unnecessary degradation to the quality and perceptibility of the compressed image.

FIG. 5 illustrates is a flow diagram of a method 500 for selectively applying a pixel value overflow encoding and compression technique, which may improve compression rate and further increase the quality and perceptibility of compressed images by reducing pixel error accumulation, in accordance with the present embodiments. The method 500 may be performed utilizing one or more processors (e.g., encoder device 204) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or any combination thereof.

The method 500 may begin at block 502 with one or more processors (e.g., encoder device 204) accessing a first set of pixel values including a first subset of pixel values and a second subset of pixel values. For example, in one embodiment, the image may include an 8-bit color image to be compressed and stored and/or transmitted. The method 500 may continue at block 504 with the one or more processors (e.g., encoder device 204) determining an overflow range based on a pixel value overflow covering the second subset and an overflow representation of the first subset of pixel values. For example, for an N-bit image, the encoder device may determine an original range (e.g., $\Delta_{Original}$) of the pixel values (e.g., ranging from 0 to $2^N-1$) included in the original image, and further determine an overflow range (e.g., $\Delta_{Overflow}$) based on, for example, a difference between the lowest pixel value of an upper range of pixel values of the original range and the highest pixel value of an overflow representation of the original range.

The method 500 may then continue at decision 506 with the one or more processors (e.g., encoder device 204) determining whether the overflow range (e.g., $\Delta_{Overflow}$) is less than the original range (e.g., $\Delta_{Original}$). For example, the encoder device 204 may compare the overflow range (e.g., $\Delta_{Overflow}$) to the original range (e.g., $\Delta_{Original}$). If the overflow range (e.g., $\Delta_{Overflow}$) is determined to be less than the original range (e.g., $\Delta_{Original}$), the method 500 may then continue at block 508 with the one or more processors (e.g., encoder device 204) generating quantization levels corresponding to the overflow range. For example, the encoder device 204 may generate one or more quantization levels corresponding to the overflow range (e.g., $\Delta_{Overflow}$) and the upper range of pixel values (e.g., original pixel values above the median pixel value) of the original range (e.g., $\Delta_{Original}$). The method 500 may then conclude at block 510 with the one or more processors (e.g., encoder device 204) associating each pixel value of a second set of pixel values with one of the quantization levels corresponding to the overflow range. For example, the encoder device 204 may associate each pixel value of the overflow range (e.g., $\Delta_{Overflow}$) and the upper range of pixel values (e.g., original pixel values above the median pixel value) of the original range with a quantization level of the generated quantization levels corresponding to the overflow range (e.g., $\Delta_{Overflow}$) and the upper range of pixel values (e.g., original pixel values above the median pixel value).

On the other hand, referring again to decision 506, if the overflow range (e.g., $\Delta_{Overflow}$) is determined not to be less than the original range (e.g., $\Delta_{Original}$), the method 500 may continue at block 512 with the one or more processors (e.g., encoder device 204) generating quantization levels corresponding to the range covering the first set of pixel values. For example, when the overflow range (e.g., $\Delta_{Overflow}$) is determined by the encoder device 204 not to be less than the original range (e.g., $\Delta_{Original}$), the encoder device 204 may determine that any potential pixel error accumulation is below a maximum error accumulation threshold (e.g., predetermined acceptable threshold). The method 500 may then conclude at block 514 with the one or more processors (e.g., encoder device 204) associating each pixel value of the first set of pixel values with one of the quantization levels corresponding to the range covering the first set of pixel values. For example, the encoder device 204 may associate each pixel value with a quantization level (e.g., each selected based on the pixel accumulation error) of quantization levels corresponding to the original range (e.g., $\Delta_{Original}$).

Therefore, the presently disclosed embodiments may allow for the selective application of the present pixel value overflow encoding and compression techniques, such that the quantization levels may be generated and determined based on the comparison between the overflow range (e.g., $\Delta_{Overflow}$) and the original range (e.g., $\Delta_{Original}$), as opposed to, for example, based solely upon the pixel error accumulation. In this way, the number of n total bits of each quantized pixel value may be reduced. Thus, the presently disclosed embodiments may improve compression rate. Further, even when the number of n total bits of each quantized pixel value is maintained, the pixel error accumulation is reduced. Accordingly, the presently disclosed embodiments may improve compression rate further increase the quality and perceptibility of compressed images by reducing pixel error accumulation.

Figure 6:
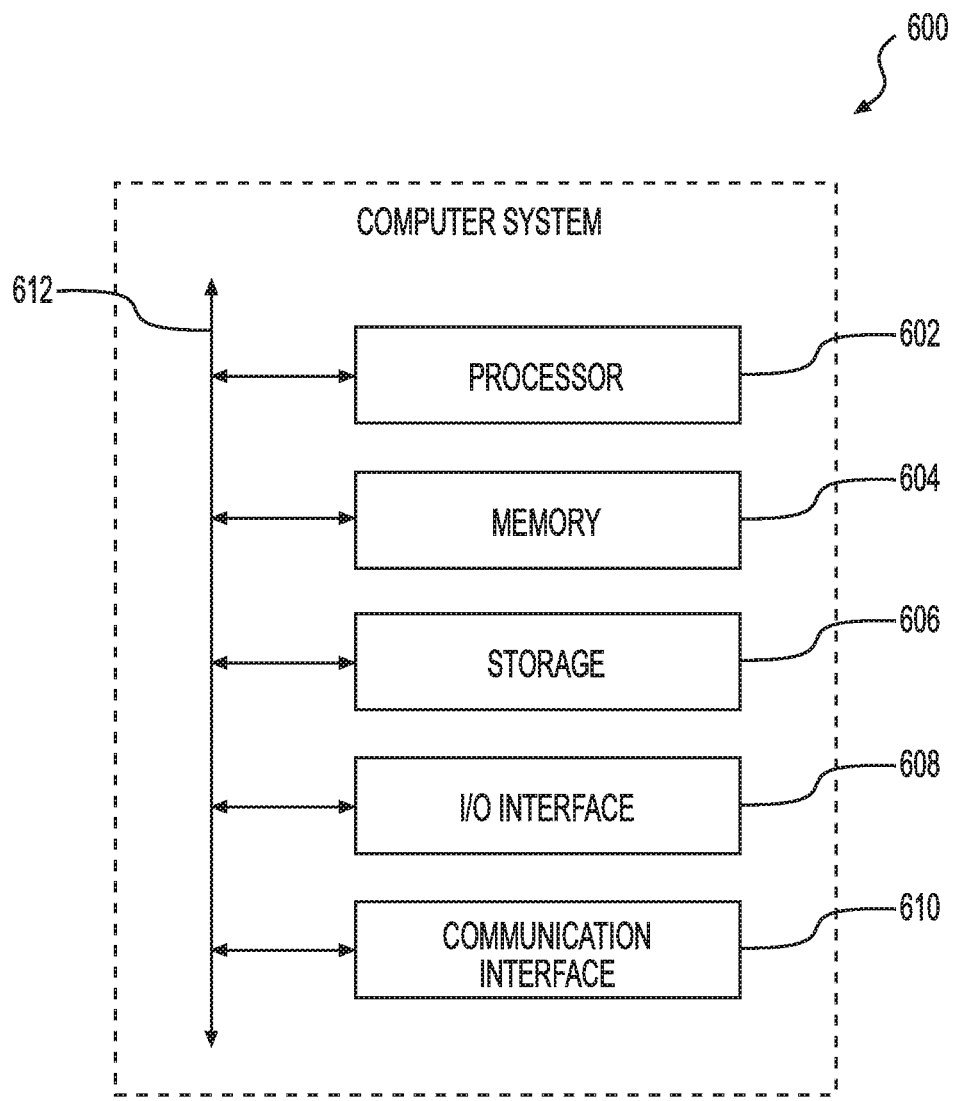
FIG. 6 illustrates an example computer system, in accordance with the present embodiments.

FIG. 6 illustrates an example computer system 600 that may be useful in performing one or more of the foregoing techniques as presently disclosed herein. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate. In certain embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In certain embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602.

Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In certain embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In certain embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In certain embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In certain embodiments, communication interface 610 includes hardware, software, or both providing one or more interfaces for communication (such as, for example, packet-based communication) between computer system 600 and one or more other computer systems 600 or one or more networks. As an example, and not byway of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In certain embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method implemented by a computing system, the method comprising:
 accessing a first set of pixel values of an image having a bit depth, wherein the first set of pixel values comprises a first subset of pixel values and a second subset of pixel values, and wherein each pixel value in the first subset of pixel values is less than each pixel value in the second subset of pixel values;
determining an overflow range based at least in part on a pixel value overflow associated with the bit depth, wherein the overflow range covers a second set of pixel values comprising (1) the second subset of pixel values and (2) an overflow representation of the first subset of pixel values; and
in response to determining that the overflow range is less than a range covering the first set of pixel values:
generating quantization levels corresponding to the overflow range; and
associating each pixel value of the second set of pixel values with one of the quantization levels.

2. The method of claim 1, wherein the image comprises an N-bit image, and wherein N comprises a resolution of the image in bits.

3. The method of claim 2, wherein accessing the first set of pixel values comprises accessing a set of pixel values ranging from 0 to $2^N-1$.

4. The method of claim 3, wherein the pixel value overflow comprises an integer pixel value equal to or greater than $2^N$.

5. The method of claim 4, further comprising:
combining the integer pixel value with each pixel value of the first subset of pixel values to generate a third subset of pixel values, wherein the second set of pixel values comprises the second subset of pixel values and the third subset of pixel values.

6. The method of claim 5, further comprising:
determining whether a color associated with a pixel value of the third subset of pixel values is inverted with respect to a corresponding pixel value of the first subset of pixel values or the quantization levels corresponding to the overflow range; and
in response to determining that the color is inverted:
setting the pixel value of the third subset of pixel values to a value of $2^N-1$; and
quantizing the pixel value to a quantization level of less than $2^N-1$.

7. The method of claim 5, further comprising:
determining whether a color associated with a pixel value of the third subset of pixel values is inverted with respect to a corresponding pixel value of the first subset of pixel values or the quantization levels corresponding to the overflow range; and
in response to determining that the color is inverted, setting the pixel value of the third subset of pixel values to a lowest quantization level of the quantization levels corresponding to the overflow range.

8. The method of claim 5, wherein combining the integer pixel value with each pixel value of the first subset of pixel values comprises combining the integer pixel value with each pixel value below a median pixel value of the first set of pixel values.

9. The method of claim 5, wherein combining the integer pixel value with each pixel value of the first subset of pixel values comprises adding a third set of pixel values to the first set of pixel values, and wherein the third set of pixel values comprises the integer pixel value at pixel locations corresponding to the first subset of pixel values and a zero value at pixel locations corresponding the second subset of pixel values.

10. The method of claim 1, further comprising:
in response to determining that the overflow range is not less than the range covering first set of pixel values:
generating quantization levels corresponding to the range covering the first set of pixel values; and
associating each pixel value of the first set of pixel values with one of the quantization levels corresponding to the range covering the first set of pixel values.

11. A non-transitory computer-readable medium comprising instructions that, when executed by one or more processors of a computing system, cause the one or more processors to:
access a first set of pixel values of an image having a bit depth, wherein the first set of pixel values comprises a first subset of pixel values and a second subset of pixel values, and wherein each pixel value in the first subset of pixel values is less than each pixel value in the second subset of pixel values;
determine an overflow range based at least in part on a pixel value overflow associated with the bit depth, wherein the overflow range covers a second set of pixel values comprising (1) the second subset of pixel values and (2) an overflow representation of the first subset of pixel values; and
in response to determining that the overflow range is less than a range covering the first set of pixel values:
generate quantization levels corresponding to the overflow range; and
associate each pixel value of the second set of pixel values with one of the quantization levels.

12. The non-transitory computer-readable medium of claim 11, further comprising instructions to cause the one or more processors to access a set of pixel values ranging from 0 to $2^N-1$ as the first set of pixel values, and wherein N comprises a resolution of the image in bits.

13. The non-transitory computer-readable medium of claim 12, further comprising instructions to cause the one or more processors to determine an integer pixel value equal to or greater than $2^N$ as the pixel value overflow.

14. The non-transitory computer-readable medium of claim 13, further comprising instructions to cause the one or more processors to combine the integer pixel value with each pixel value of the first subset of pixel values to generate a third subset of pixel values, wherein the second set of pixel values comprises the second subset of pixel values and the third subset of pixel values.

15. The non-transitory computer-readable medium of claim 14, further comprising instructions to cause the one or more processors to:
determine whether a color associated with a pixel value of the third subset of pixel values is inverted with respect to a corresponding pixel value of the first subset of pixel values or the quantization levels corresponding to the overflow range; and
in response to determining that the color is inverted:
set the pixel value of the third subset of pixel values to a value of $2^N-1$; and
quantize the pixel value to a quantization level of less than $2^N-1$.

16. The non-transitory computer-readable medium of claim 14, further comprising instructions to cause the one or more processors to:
determine whether a color associated with a pixel value of the third subset of pixel values is inverted with respect to a corresponding pixel value of the first subset of pixel values or the quantization levels corresponding to the overflow range; and
in response to determining that the color is inverted, set the pixel value of the third subset of pixel values to a lowest quantization level of the quantization levels corresponding to the overflow range.

17. The non-transitory computer-readable medium of claim 13, further comprising instructions to cause the one or more processors to combine the integer pixel value with each pixel value below a median pixel value of the first set of pixel values.

18. The non-transitory computer-readable medium of claim 11, further comprising instructions to cause the one or more processors to:
   in response to determining that the overflow range is not less than the range covering first set of pixel values:
      generate quantization levels corresponding to the range covering the first set of pixel values; and
      associate each pixel value of the first set of pixel values with one of the quantization levels corresponding to the range covering the first set of pixel values.

19. A system comprising:
   one or more non-transitory computer-readable storage media including instructions; and
   one or more processors coupled to the storage media, the one or more processors configured to execute the instructions to:
      access a first set of pixel values of an image having a bit depth, wherein the first set of pixel values comprises a first subset of pixel values and a second subset of pixel values, and wherein each pixel value in the first subset of pixel values is less than each pixel value in the second subset of pixel values;
      determine an overflow range based at least in part on a pixel value overflow associated with the bit depth, wherein the overflow range covers a second set of pixel values comprising (1) the second subset of pixel values and (2) an overflow representation of the first subset of pixel values; and
      in response to determining that the overflow range is less than a range covering the first set of pixel values:
         generate quantization levels corresponding to the overflow range; and
         associate each pixel value of the second set of pixel values with one of the quantization levels.

20. The system of claim 19, wherein the one or more processors are further configured to:
   in response to determining that the overflow range is not less than the range covering first set of pixel values:
      generate quantization levels corresponding to the range covering the first set of pixel values; and
      associate each pixel value of the first set of pixel values with one of the quantization levels corresponding to the range covering the first set of pixel values.

* * * * *